(12) United States Patent
Deguchi

(10) Patent No.: US 6,581,567 B2
(45) Date of Patent: Jun. 24, 2003

(54) AIR INTAKE CONTROL DEVICE OF FUEL INJECTION ENGINE

(75) Inventor: Hiromi Deguchi, Hamamatsu (JP)

(73) Assignee: Suzuki Motor Corporation, Shizuoka-ken (JP)

( * ) Notice: Subject to any disclaimer, the term of this patent is extended or adjusted under 35 U.S.C. 154(b) by 57 days.

(21) Appl. No.: 09/968,531

(22) Filed: Oct. 2, 2001

(65) Prior Publication Data

US 2002/0050268 A1 May 2, 2002

(30) Foreign Application Priority Data

Oct. 27, 2000 (JP) ..................................... 2000-329431

(51) Int. Cl.⁷ ............................. F02D 9/08; F02M 9/00
(52) U.S. Cl. ..................... 123/336; 123/442; 123/400
(58) Field of Search ................................ 123/336, 337, 123/399, 400, 402, 403, 442; 261/52

(56) References Cited

U.S. PATENT DOCUMENTS

| | | | | | |
|---|---|---|---|---|---|
| 2,174,062 A | * | 9/1939 | Raesler | ...................... | 180/178 |
| 2,339,867 A | * | 1/1944 | Mann Jr. | ................ | 137/630.19 |
| 2,724,376 A | * | 11/1955 | Baumheckel | ................ | 123/441 |
| 3,807,709 A | * | 4/1974 | Suda et al. | ................. | 261/39.2 |
| 4,011,844 A | * | 3/1977 | Hirosawa et al. | .......... | 261/39.2 |
| 4,181,107 A | * | 1/1980 | Nomura et al. | ............ | 261/39.2 |
| 4,192,834 A | * | 3/1980 | Berkbigler | .................... | 261/52 |
| 4,196,156 A | * | 4/1980 | Rogerson et al. | .......... | 261/39.3 |
| 4,391,249 A | * | 7/1983 | Bianchi et al. | ............. | 123/438 |
| 4,462,357 A | * | 7/1984 | Lockhart | ..................... | 123/336 |
| 4,662,333 A | * | 5/1987 | Martel | ................... | 123/339.13 |
| 4,768,486 A | * | 9/1988 | Koike et al. | ................. | 123/442 |
| 4,773,362 A | * | 9/1988 | Wissmann et al. | ...... | 123/179.16 |
| 4,892,076 A | * | 1/1990 | Toshimits et al. | ............ | 123/442 |
| 5,157,956 A | * | 10/1992 | Isaji et al. | .................... | 73/1.75 |
| 5,220,828 A | * | 6/1993 | Sodeno et al. | ............. | 73/118.1 |
| 5,408,969 A | * | 4/1995 | Obaraki et al. | ............. | 123/336 |
| 5,419,293 A | * | 5/1995 | Nagai | ......................... | 123/336 |
| 5,429,087 A | * | 7/1995 | Tsujino et al. | .............. | 123/336 |
| 5,520,146 A | * | 5/1996 | Hrovat et al. | ............... | 123/336 |
| 5,575,255 A | * | 11/1996 | Abe et al. | ..................... | 123/336 |
| 5,611,312 A | * | 3/1997 | Swanson et al. | ............. | 123/436 |
| 5,915,355 A | * | 6/1999 | Andreasson | ................ | 123/336 |
| 6,000,683 A | * | 12/1999 | Van Allen | ..................... | 261/52 |
| 6,167,863 B1 | * | 1/2001 | Kazama et al. | ............. | 123/295 |
| 6,202,989 B1 | * | 3/2001 | Pattullo | ........................ | 261/52 |
| 6,422,201 B1 | * | 7/2002 | Yamada et al. | ............. | 123/336 |
| 6,454,245 B2 | * | 9/2002 | Kobayashi | .................... | 261/52 |

FOREIGN PATENT DOCUMENTS

| | | |
|---|---|---|
| JP | 5-31231 Y2 | 8/1993 |
| JP | 2530713 Y2 | 12/1996 |

* cited by examiner

*Primary Examiner*—Henry C. Yuen
*Assistant Examiner*—Hai H Huynh
(74) *Attorney, Agent, or Firm*—Nixon & Vanderhye, P.C.

(57) ABSTRACT

In an air intake control device of a fuel injection engine, a throttle body includes a cam lever rotatably mounted on a sub-throttle valve, a stopper cam for rotating a main throttle pulley, and a link mechanism for linking the cam lever and the stopper cam. When the sub-throttle valve is fully opened while a main throttle valve is closed, the rotation of the cam lever is transmitted to the stopper cam by the link mechanism, and the main throttle valve is opened at the angle required for the first idling by the rotation of the stopper cam.

6 Claims, 7 Drawing Sheets

AIR INTAKE CONTROL DEVICE OF FUEL INJECTION ENGINE

BACKGROUND OF THE INVENTION

1. Field of the Invention

The present invention relates to an air intake control device of an engine, and more particularly, to an air intake control device of a fuel injection engine having throttle valves.

2. Description of the Related Art

In a general type of internal combustion engine, such as an in-vehicle engine, a piston is disposed in a cylinder block so as to move reciprocally, and is connected to the crankshaft of the internal combustion engine by a connecting rod. The reciprocal movement of the piston is converted into the rotation of the crankshaft by the connecting rod.

The cylinder block is provided with a cylinder head, and a combustion chamber is disposed between the cylinder head and a head portion of the piston. The cylinder head includes an intake passage and an exhaust passage communicating with the combustion chamber. A throttle valve for controlling the amount of air flowing through the intake passage, and an injector extending to the combustion chamber so as to inject the fuel into the intake passage are disposed in the intake passage. The cylinder head has a spark plug for igniting a mixed gas in the combustion chamber.

During an intake process of the internal combustion engine, air is taken into the intake passage extending to the combustion chamber, fuel is injected from the injector, and the combustion chamber is filled with a mixed gas of air and fuel. Next, during a compression process of the internal combustion chamber, the mixed gas in the combustion chamber is compressed by the movement of the piston. The compressed mixed gas is ignited by the spark plug and explodes. The piston is moved in a direction opposite from the above direction by the force of the explosion, and the internal combustion engine is brought into an explosion process. Next, in an exhaust process of the internal combustion engine, the mixed gas in the combustion chamber is exhausted outside through the exhaust passage by the movement of the piston.

In recent years, a method for optimally controlling the air intake in the engine having the above configuration has been known in which a sub-throttle valve disposed in an intake passage is opened and closed according to the running state of the engine.

For example, Japanese Utility Model Application Laid-open Hei 3 No.116740 proposes an optimal air intake control method in which a first throttle valve and a second throttle valve are placed in an intake passage, and air control is performed based on the engine temperature. In this method, since the air intake control is executed with a bypass, it is possible to prevent the engine from stalling even during a cooling process in which the second throttle valve is completely closed.

Japanese Utility Model Application Laid-open Hei 5 No. 31231 proposes another method in which a first throttle valve and a second throttle valve are placed in an intake passage and are linked by a link mechanism, and the second throttle valve is forcibly and completely closed while the first throttle valve is fully opened. In this method, even when the first throttle valve drivingly connected to an accelerator pedal becomes out of control due to any trouble and is fully opened, the engine can be stopped by forcibly and completely closing the second throttle valve. This ensures safety.

In the above-described methods using the second throttle valve, a so-called sub-throttle valve, a motor is usually used as an actuator only for controlling the driving of the sub-throttle valve under the present circumstances.

The sub-throttle valve is effective in a running engine running state in which the main throttle valve is opened to a medium to high degree, but is not effective when the main throttle valve is closed.

A further method is known in which FID (first idling) during an engine cold start is performed while controlling the area of a bypass by coolant and wax. However, idling is performed while the rotating speed of the engine is maintained at a high level until the coolant temperatures rises, and this decreases controllability. Moreover, since it is necessary to ensure the bypass, the cost and weight are increased.

In a conventional engine in which a FID lever is manually operated during an engine cold start, the driver sometimes fails to return the lever, and performs normal operations in a FID state even after warming-up is completed. This is unfavorable for the engine and the environment.

SUMMARY OF THE INVENTION

The present invention has been made in view of the above drawbacks of the conventional arts, and an object of the invention is to provide an air intake control device of a fuel injection engine in which the first idling can be automatically controlled with a simple structure while controlling both the operation of a sub-throttle valve and the first idling during air intake control.

In order to achieve the above object, according to an aspect of the present invention, there is provided an air intake control device of a fuel injection engine having a fuel pump, an injector for injecting fuel from the fuel pump, and a throttle body in which the injector is mounted, wherein the throttle body includes a main throttle valve to be opened and closed in connection with the operation of a throttle grip by a driver, a sub-throttle valve to be opened and closed by a motor driving according to the running state of the engine, a driving rotator mounted at one end of a rotation shaft of the sub-throttle valve so as to corotate with the rotation shaft, a driven rotator for rotating a main throttle pulley for operating the main throttle valve, and a link mechanism for linking the driving rotator and the driven rotator, and wherein, when the sub-throttle valve is fully opened while the main throttle valve is closed, the rotation of the driving rotator is transmitted to the driven rotator by the link mechanism so as to rotate the driven rotator, and the main throttle valve is opened at a predetermined angle necessary for the first idling by the rotation of the driven rotator.

Preferably, the link mechanism includes a link member to be linked to the driving rotator, and an intermediate cam connected to the link member at one end and turnably mounted on the throttle body, and a part of the intermediate cam is contacted with the driven rotator so as to rotate the driven rotator.

Preferably, the driving rotator, the driven rotator, the link mechanism, and the main throttle pulley are placed on one side of the outer periphery of the throttle body, while a sub-throttle pulley for turning the sub-throttle valve, a driving motor for driving the sub-throttle pulley, and a throttle position sensor for detecting a rotation angle of the main throttle valve are placed on the other side.

Preferably, the engine further includes a coolant temperature sensor for detecting the temperature of a coolant for the engine, and an electronic control device for inputting a detected value from the coolant temperature sensor and controlling the opening and closing of the sub-throttle valve, and the electronic control device causes the sub-throttle valve to be fully opened for a predetermined period when the coolant temperature input when the engine is started is lower than a preset value.

Preferably, the engine is mounted in a motorcycle having a pair of main frames disposed on the right and left sides in the frame widthwise direction so as to extend rearward and diagonally downward from a head pipe of a frame, a cylinder head is placed between the main frames with an intake passage opening backward, and the driving motor for the sub-throttle valve is placed on the inner sides of the main frames behind the intake passage.

Preferably, the sub-throttle valve is placed on the upstream side from the main throttle valve in an air flow direction inside the throttle body.

According to the present invention, since the link mechanism is provided to link the main throttle valve and the sub-throttle valve, the main throttle valve can be opened at a small angle in a state in which the sub-throttle valve is fully opened during an engine cold start, and this allows the first idling to be automatically controlled. Consequently, it is possible to eliminate a choke valve, a choke lever, and an actuating cable used during an engine cold start in the conventional engine, and to prevent the choke from not being returned inadvertently.

By opening the main throttle valve at a small angle when performing a deceleration in a state in which the engine is being rotated at high speed, premixed air is prevented from being further enriched.

Since the link mechanism includes the link member to be linked to the driving rotator, and the intermediate cam linked to the link member and rotatably mounted on the throttle body, even when the driving rotator mounted on the sub-throttle valve shaft and the stopper cam for operating the main throttle pulley are apart from each other, the driving rotator can be prevented from being increased in size to be contacted with the stopper cam, by placing the intermediate cam linked to the link member between the driving rotator and the stopper cam in parallel. This makes it possible to improve the operability of the sub-throttle valve without decreasing the responsiveness of the sub-throttle valve.

Since the motor for driving the sub-throttle pulley and the throttle position sensor for the main throttle valve are placed on the same side of the throttle body, the components having harnesses can be collected, and the operability can be improved. Therefore, a harness is not placed on the side opposite from the side where the link member and the main throttle pulley are mounted. Moreover, since the components having a small outer shape can be collectively placed, the overall size of the throttle body can be reduced.

Since the coolant temperature sensor for detecting the temperature of the coolant for the engine and the electronic control device for controlling the opening and closing of the sub-throttle valve are provided, the first idling can be performed for a predetermined period after detecting the temperature of the coolant when the engine is started. This makes it possible to reliably improve the startability of the engine, and to prevent the choke from not being returned inadvertently.

In general, the cylinder head of the engine is the widest, and the space between the cylinder head and the main frames is small. Therefore, the main frames can be inhibited from being extended in the frame widthwise direction by placing the driving motor for the sub-throttle valve behind the cylinder head.

The amount of air intake can be reliably controlled by placing the sub-throttle valve on the upstream side in the air flow direction of the main throttle valve.

Further objects, features, and advantages of the present invention will become apparent from the following description of the preferred embodiments with reference to the attached drawings.

DESCRIPTION OF THE PREFERRED EMBODIMENTS

An embodiment of the present invention will be described in detail below with reference to the attached drawings.

Figure 1:
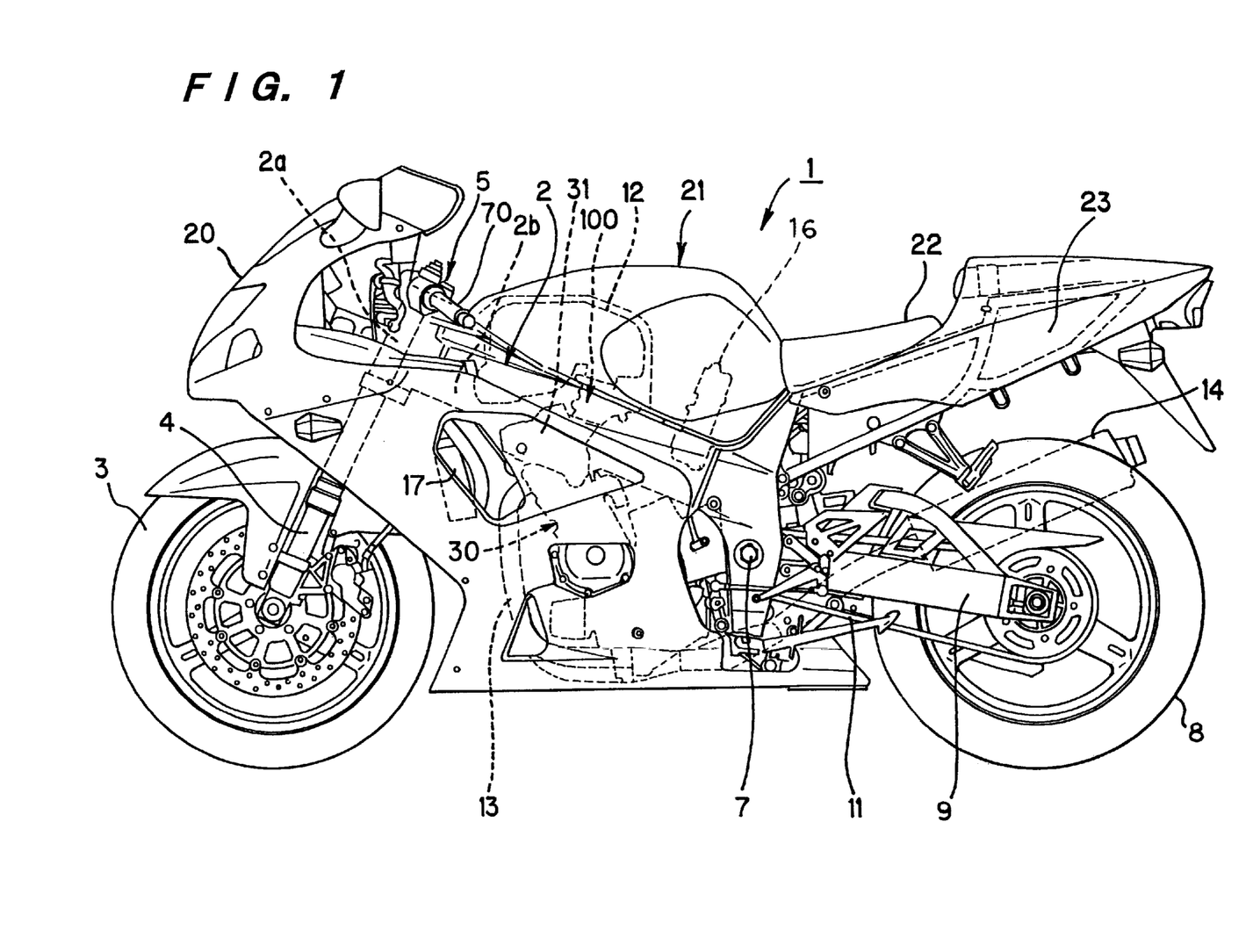
FIG. 1 is a general side view showing the overall configuration of a motorcycle in which an engine using an air intake control device of a fuel injection engine according to an embodiment of the present invention is mounted.
Figure 2:
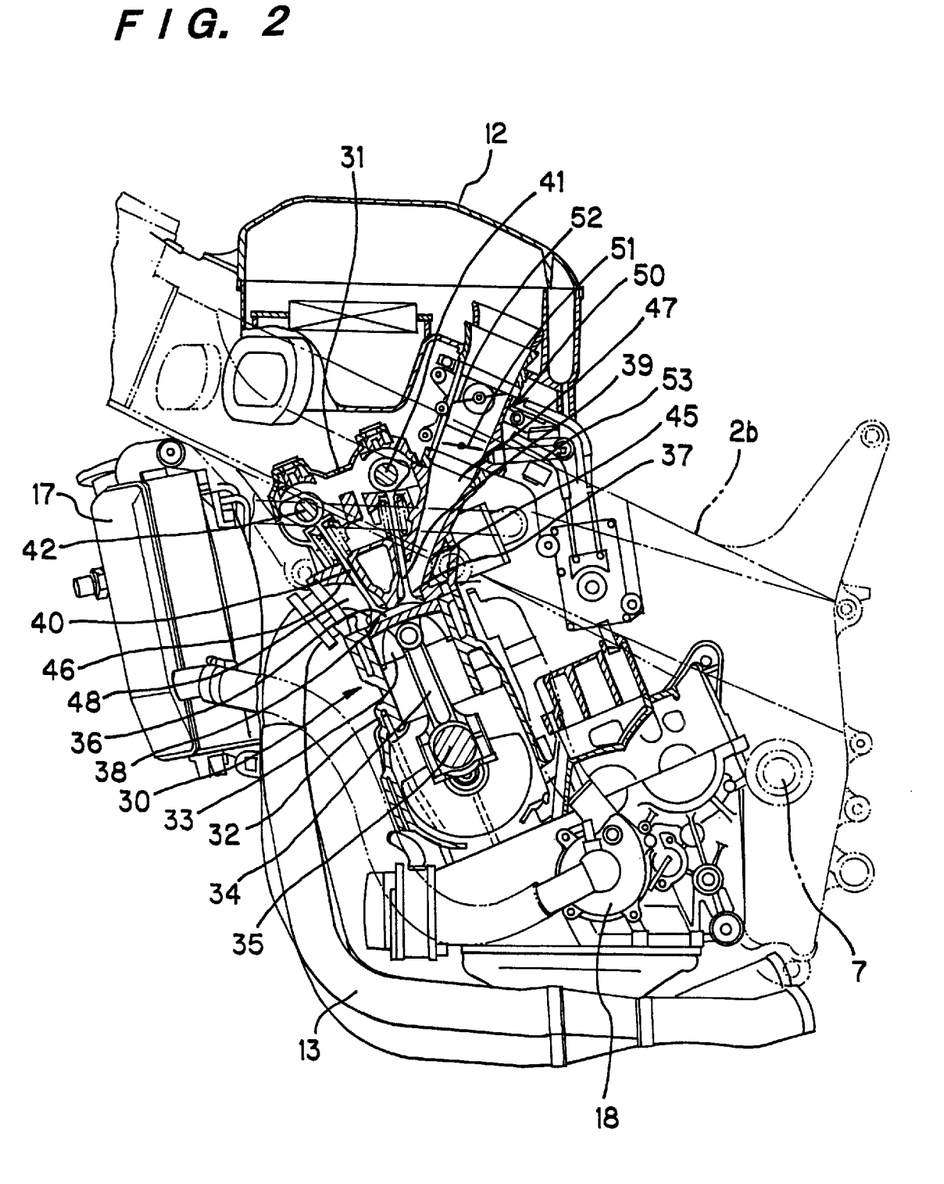
FIG. 2 is a partly sectional side view showing the structure of the engine.
Figure 3:
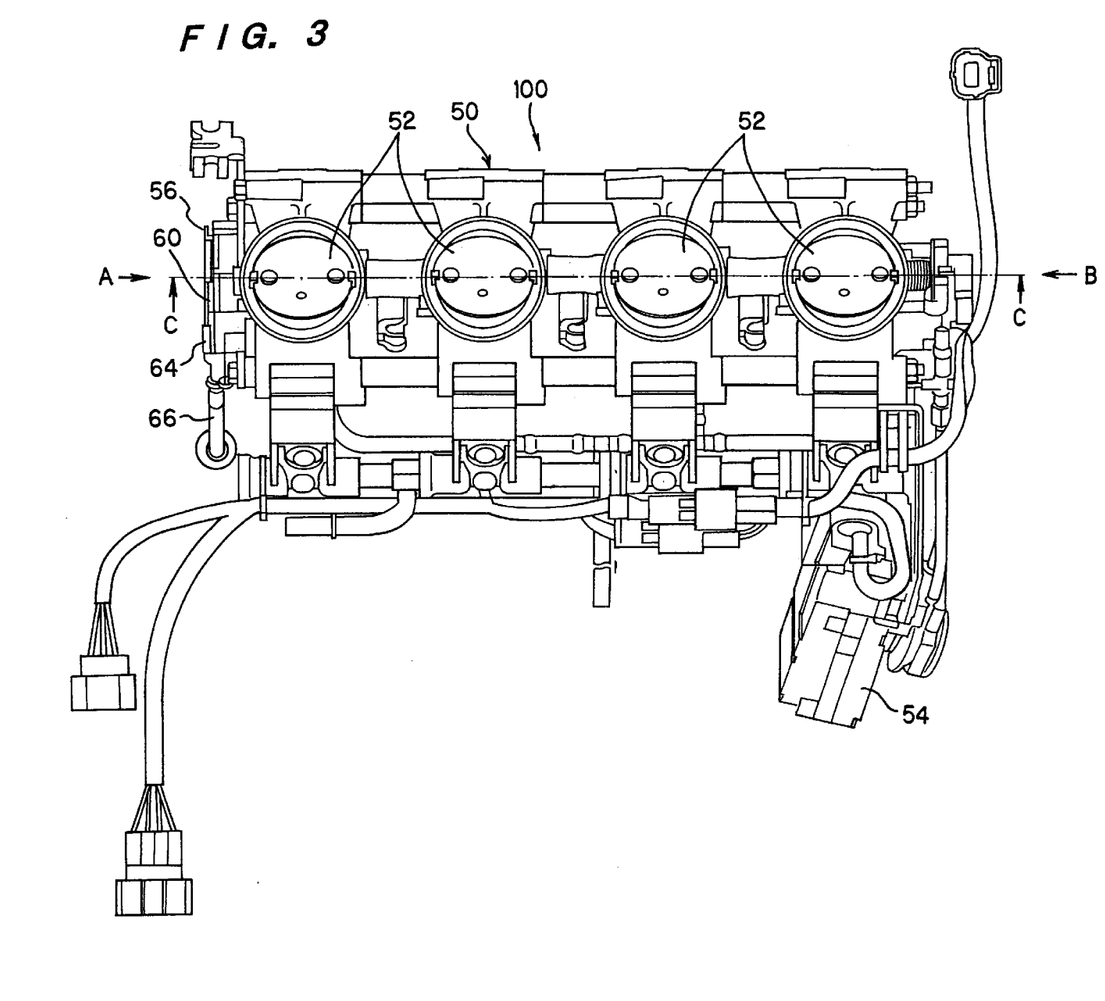
FIG. 3 is a plan view showing the structure of a throttle body in the air intake control device.
Figure 4:
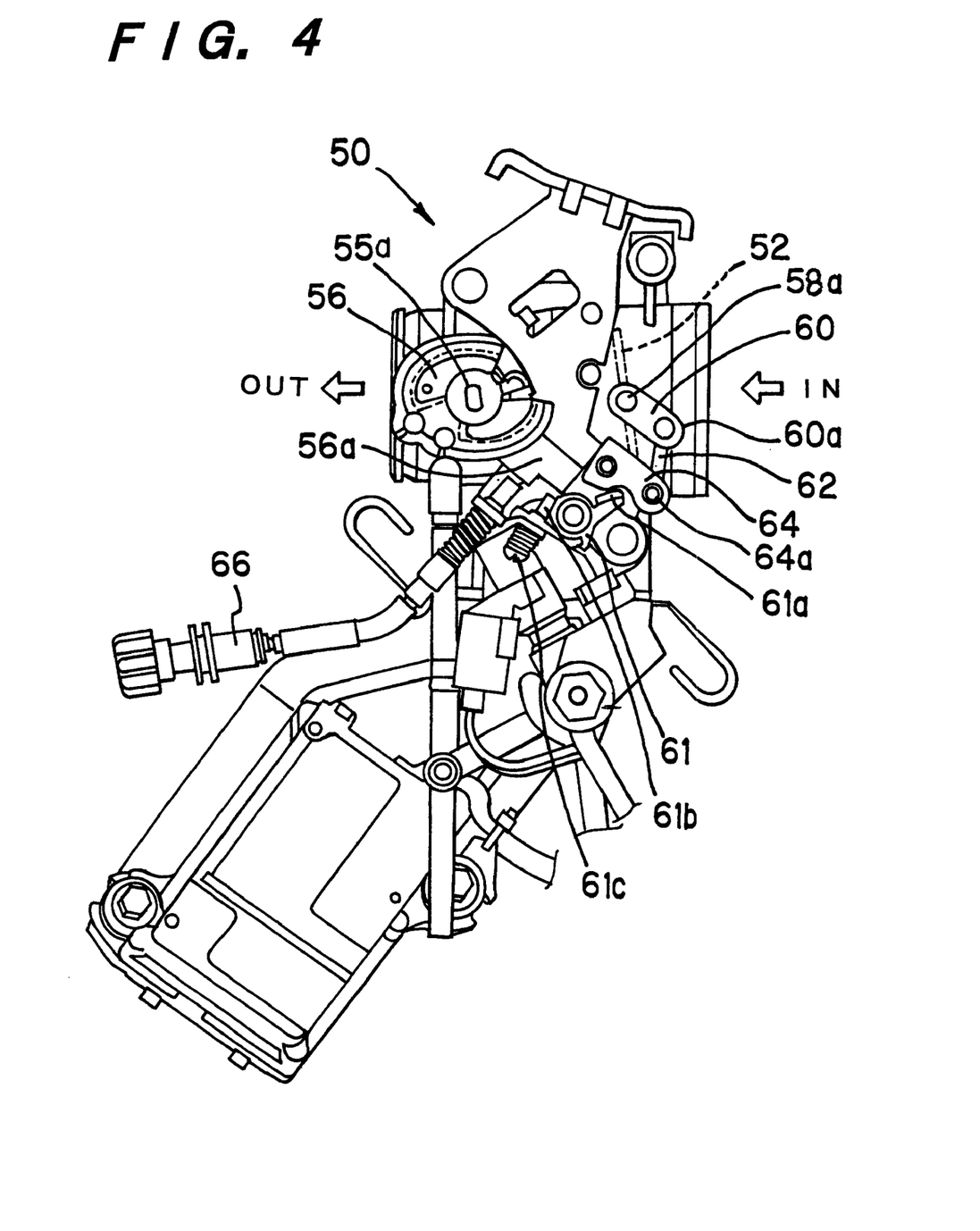
FIG. 4 is a view, as viewed from a direction of arrow A in FIG. 3.
Figure 5:
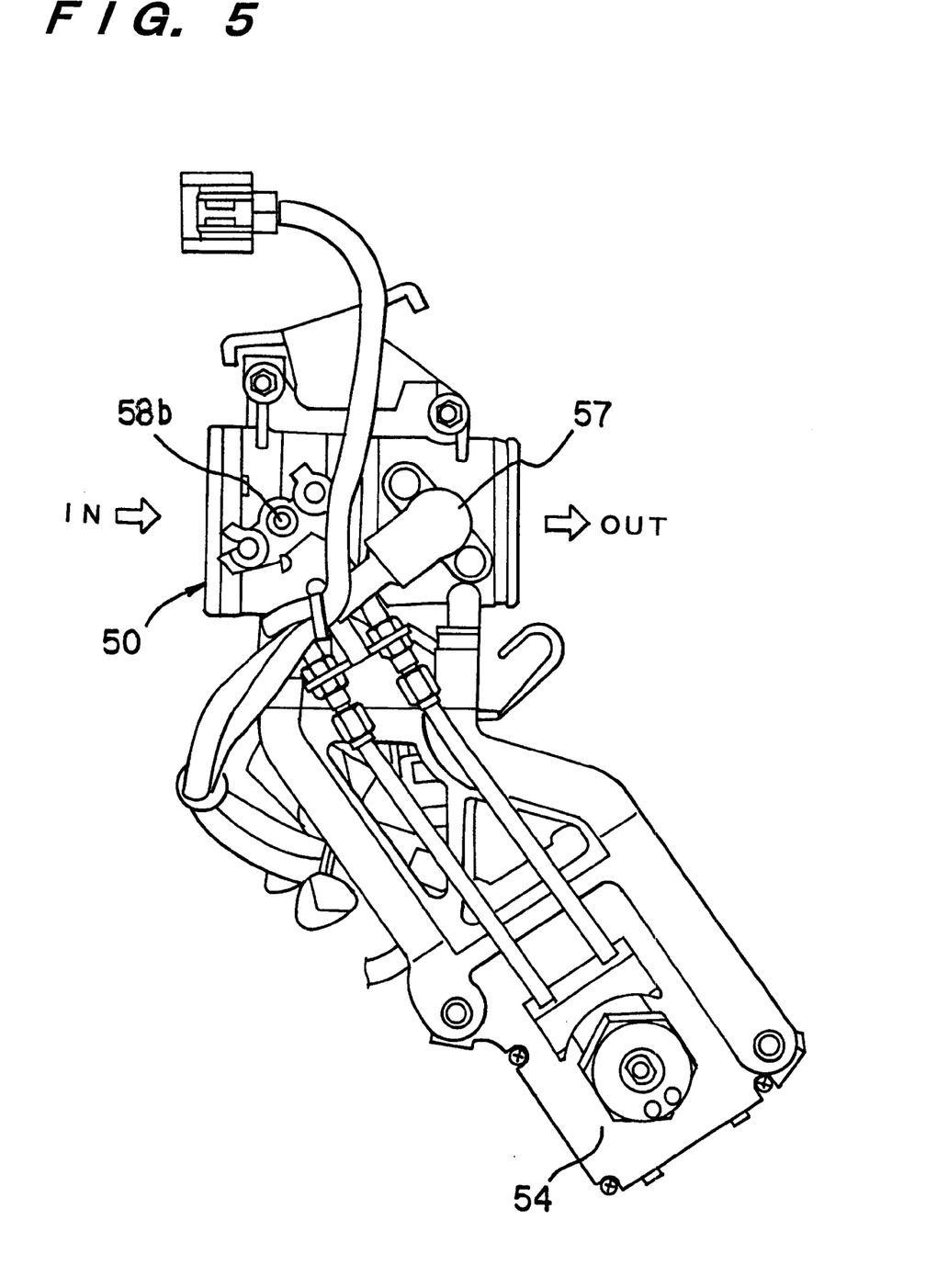
FIG. 5 is a view, as viewed from a direction of arrow B in FIG. 3.
Figure 6:
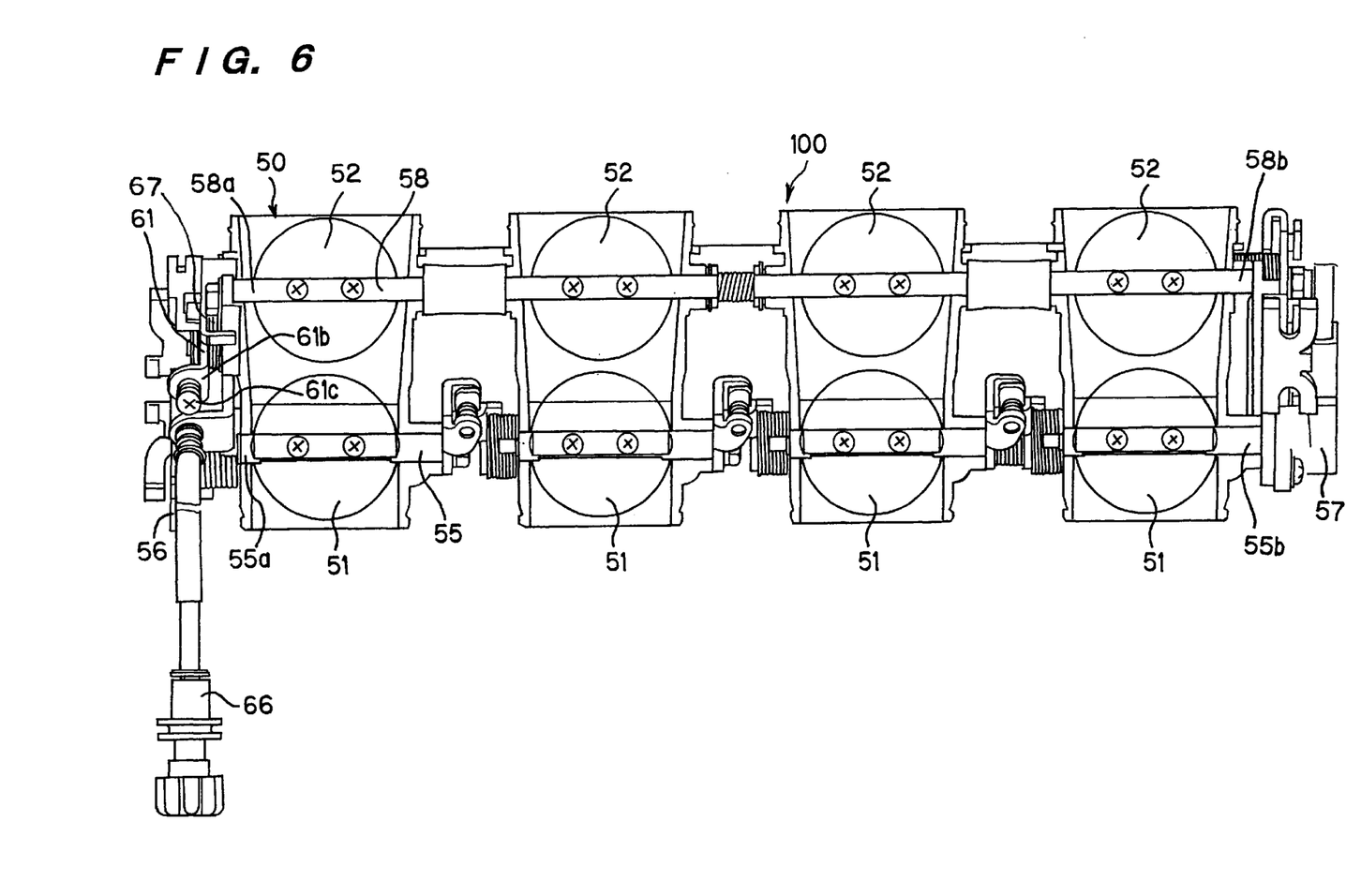
FIG. 6 is a view, as viewed from a direction of section line C—C in FIG. 3.

FIGS. 1 to 6 show an embodiment of the present invention. FIG. 1 is a general side view showing the overall configuration of a motorcycle having an engine using a fuel injection engine air intake control device according to an embodiment of the present invention, FIG. 2 is a partly sectional side view showing the configuration of the engine, FIG. 3 is a plan view showing the structure of a throttle body in the air intake control device, FIG. 4 is a view, as viewed from a direction of arrow A in FIG. 3, FIG. 5 is a view, as viewed from a direction of arrow B in FIG. 3, and FIG. 6 is a view, as viewed from a direction of section line C—C in FIG. 3.

In this embodiment, as shown in FIG. 1, a front fork 4 for rotatably supporting a front wheel 3 is mounted at the front of a frame 2 so as to be turned right and left by handlebars 5. On the other hand, a swing arm 9 extending rearward is supported by a pivot shaft 7 provided in the center of the frame 2 so as to pivot up and down and to rotatably support a rear wheel 8. The swing arm 9 is buffered and suspended with cushioning by a suspension system (not shown) formed at the base end thereof.

The frame 2 includes a pair of main frames 2b disposed on the right and left sides in the frame widthwise direction so as to extend rearward and diagonally downward from a head pipe 2a. An engine 30 is suspended at the front bottom of the frame 2 so that a cylinder head 31 is placed between the main frames 2b. Power of the engine 30 is transmitted to the rear wheel 8 by a chain 11.

The engine 30 is provided with an air intake control device 100 including a coolant temperature sensor (not shown) for detecting the temperature of coolant in the engine, and an electronic control device (not shown) for inputting a detected value from the coolant temperature sensor and controlling the opening and closing of a sub-throttle valve 52 which will be described later. When the coolant temperature, which is input when the engine is started, is lower than a preset value, the electronic control device causes the sub-throttle valve 52 to be fully opened for a fixed period.

An air cleaner 12 is placed above the engine 30, and a fuel pump 16 is placed behind the air cleaner 12. An exhaust pipe 13 is connected to the front of the engine 30, and extends rearward through the lower side of the engine 30. In addition, an exhaust muffler 14 is connected to the bottom of the engine 30 adjacent to the rear wheel 8, and extends rearward along the right side of the frame 2 in the widthwise direction.

A front cowling 20 is formed integrally with the frame 2 and extends rearward from the front of the frame 2 so as to cover meters and electrical components arranged in front of the handlebars 5 and to also cover the sides and bottom of the engine 30 and peripheral components. The front cowling 20 is molded from a synthetic resin.

A radiator 17 is disposed in front of the engine 30, and is connected to a coolant pump 18 on the side of the engine 30 via a coolant hose 19. A fuel tank 21 is placed above the engine 30, and a seat 22 is detachably mounted at the rear of the fuel tank 21. The bottom and rear portions of the seat 21 are covered with a rear frame cover 23. The rear frame cover 23 is molded from a synthetic resin.

The engine 30 is of a four-cylinder four-cycle type. As shown in FIG. 2, a piston 33 is disposed in each of four cylinder blocks 32 so as to reciprocally move. The piston 33 is connected to a crankshaft 35 serving as an output shaft of the engine 30 by a connecting rod 34. The reciprocal movement of the piston 33 is converted into the rotation of the crankshaft 35 by the connecting rod 34. A cylinder head 31 is disposed at the upper end of the cylinder block 32.

A combustion chamber 36 is interposed between the cylinder head 31 and the piston 33. The cylinder head 31 has an intake port 37 and an exhaust port 38 which communicate with the combustion chamber 36. The intake port 37 and the exhaust port 38 have an intake valve 39 and an exhaust valve 40, respectively.

An intake camshaft 41 and an exhaust camshaft 42 are rotatably supported in the cylinder head 31 so as to open and close the intake valve 39 and the exhaust valve 40. The intake camshaft 41 and the exhaust camshaft 42 are connected to the crankshaft 35 via a timing belt (not shown) so that the rotation of the crankshaft 35 is transmitted thereto by the timing belt. When the intake camshaft 41 rotates, the intake valve 39 is opened or closed so as to connect or disconnect the intake port 37 and the combustion chamber 36. When the exhaust camshaft 42 rotates, the exhaust valve 40 is opened or closed so as to connect or disconnect the exhaust port 38 and the combustion chamber 36.

An intake manifold 45 and an exhaust manifold 46 are respectively connected to the intake port 37 and the exhaust port 38. An intake passage 47 is formed inside the intake manifold 45 and the intake port 37, and an exhaust passage 48 is formed inside the exhaust manifold 46 and the exhaust port 38. The intake passage 47 extends toward the back of the engine 30, and the exhaust passage 48 extends toward the front of the engine 30. Four throttle bodies 50 are placed on the upstream side of the intake manifold 45.

As shown in FIGS. 2 to 6, the throttle bodies 50 are arranged in parallel corresponding to cylinders. Each of the throttle bodies 50 includes a main throttle valve 51 which is opened and closed in response to the operation of a throttle grip 70, a sub-throttle valve 52 which is opened and closed by a motor according to the running state of the engine, and a fuel injection valve 53 for injecting fuel. The sub-throttle valve 52 is placed on the upstream side of the main throttle valve 51 in the air flow direction. The fuel injection valve 53 is placed on the downstream side of the main throttle valve 51 in the air flow direction.

The main throttle valve 51 is formed integrally with a rotation shaft 55 rotatably mounted to the throttle valve 50. As shown in FIG. 4, a main throttle pulley 56 for operating the main throttle valve 51 is formed integrally with one side end 55a of the rotation shaft 55 on the outer periphery of the throttle body 50. A throttle position sensor 57 for checking the operating state of the main throttle valve 51 is placed at the other end 55b of the outer periphery of the throttle body 50 of the rotation shaft 55.

The main throttle pulley 56 is operated via a throttle wire (not shown) which is pulled forward and backward in response to the operation of the throttle grip 70 by a driver, thereby opening and closing the main throttle valve 51. The amount of air to be taken into the combustion chamber 36 is adjusted by adjusting the opening degree of the main throttle valve 51.

The sub-throttle valve 52 is formed integrally with a rotation shaft 58 rotatably mounted to the throttle body 50. A cam lever 60 for transmitting the motion of the sub-throttle valve 52 is placed at one side end 58a of the rotation shaft 58 on the outer periphery of the throttle body 50. The other side end 58b of the outer periphery of the throttle body 50 of the rotation shaft 58 is connected to a driving motor 54 for the sub-throttle valve 52. The motor 54 is placed behind the intake passage 47 of the engine 30 placed on the inner side of the main frame 2b.

A stopper cam 61 for rotating the main throttle pulley 56 is rotatably mounted at one side end of the outer periphery of the throttle body 50 and adjacent to the main throttle pulley 56. An intermediate cam 64 is rotatably interposed between the stopper cam 61 and the cam lever 60.

The stopper cam 61 has a contact portion 61a protruding opposed to a part of the intermediate cam 64, and a main throttle valve operating portion 61b protruding opposed to a stopper portion 56a formed integrally with the main throttle pulley 56. A first idling adjusting bolt 61c is attached to the main throttle valve operating portion 61b. By determining the contact position with the stopper portion 56a in accordance with the amount of protrusion of the first idling adjusting bolt 61c, the opening degree of the main throttle valve 51 for controlling the first idling during an engine cold start is adjusted.

A valve adjusting bolt 66 is disposed opposed to the stopper portion 56a of the main throttle pulley 56. When the main throttle valve 51 is completely closed, the stopper portion 56a and the valve position adjusting bolt 66 are brought into contact, thereby adjusting the opening degree of the main throttle valve 51.

The intermediate cam 64 has an end portion 64a formed on the outer periphery thereof and protruding nearly parallel to the cam lever 60, and an arc-shaped cam operating portion 64b to be contacted with the contact portion 61a of the stopper cam 61. The end portion 64a and an end portion 60a of the cam lever 60 are pivotally connected to each other by a link bar 62. That is, the cam lever 60, the link bar 62, and the intermediate cam 64 constitute a link mechanism 65.

Operations of the main throttle valve 51 and the sub-throttle valve 52 in the air intake control device of this embodiment will now be described with reference to the drawings.

Figure 7A:
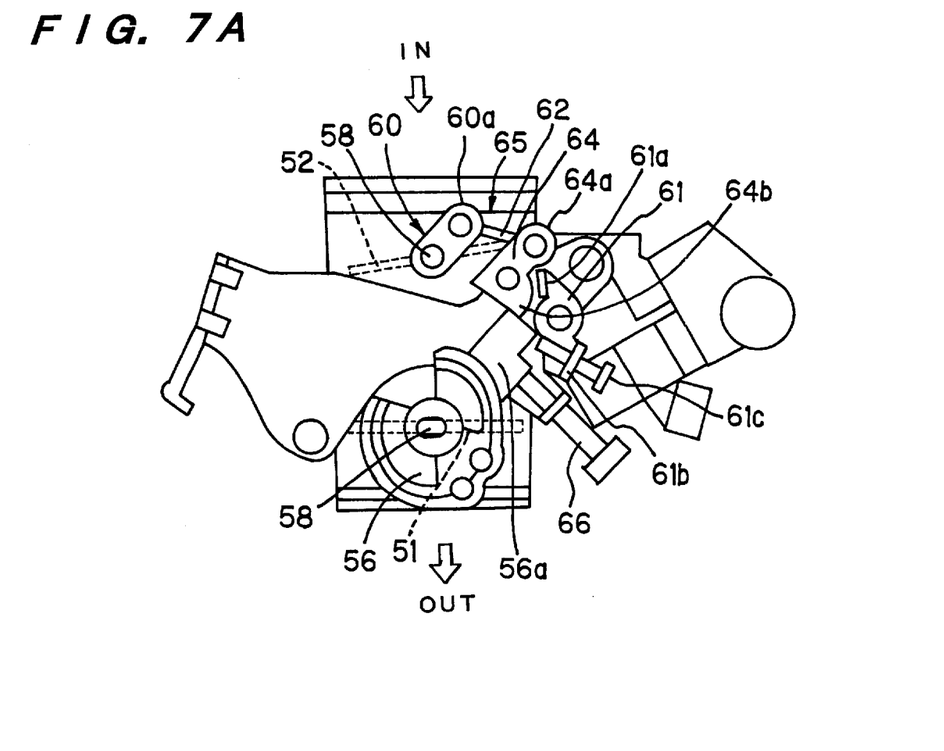
FIG. 7A is a structural view of the throttle body showing a state of a link mechanism when a sub-throttle valve is completely closed, and 7B is a structural view of the throttle body showing the operation of the link mechanism when the sub-throttle valve is fully opened.
Figure 7B:
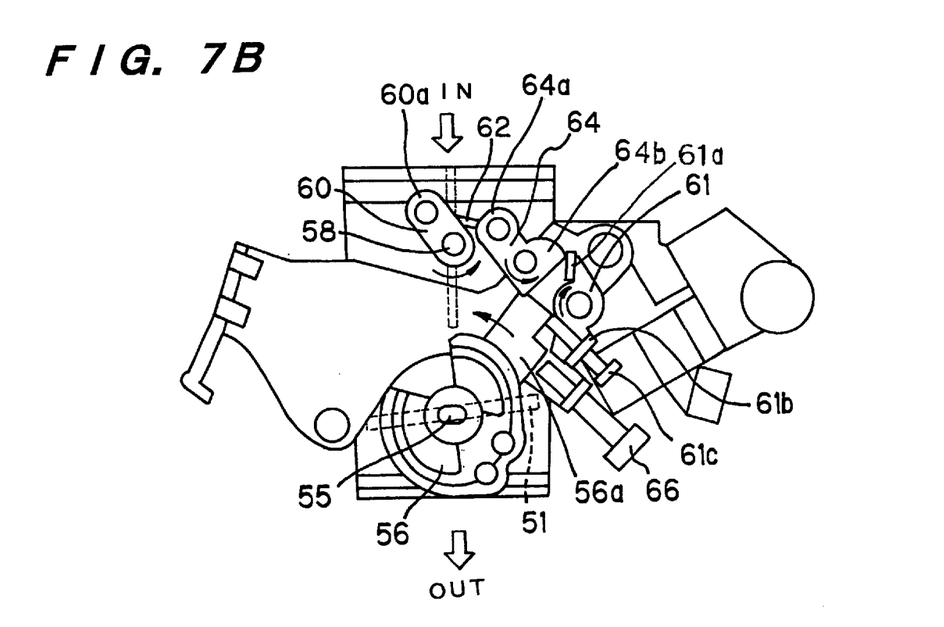

FIG. 7A is a structural view of the throttle body 50, showing the state of the link mechanism 65 when the sub-throttle valve 52 is completely closed, and FIG. 7B is a structural view of the throttle body 50, showing the operation of the link mechanism 65 when the sub-throttle valve 52 is fully opened.

When the engine is stopped, the sub-throttle valve 52 is completely closed and is placed in a substantially horizontal position, as shown in FIG. 7A. The cam operating portion 64*b* of the intermediate cam 64 is positioned so as not to be in contact with the contact portion 61*a* of the stopper cam 61.

In this case, the main throttle valve 51 is completely closed, and is positioned by the stopper portion 56*a* which is in contact with the valve position adjusting bolt 66.

The stopper portion 56*a* and the first idling adjusting bolt 61*c* are out of contact with each other.

During an engine cold start, the sub-throttle valve 52 is fully opened, that is, is turned approximately 90° in the counterclockwise direction and is placed in a substantially vertical position, as shown in FIG. 7B. With this, the cam lever 60 pivots approximately 90° in the counterclockwise direction, and the link bar 62 is drawn toward the cam lever 60. The intermediate cam 64 rotates as the end portion 64*a* of the intermediate cam 64 moves counterclockwise toward the cam lever 60, and the cam operating portion 64*b* moves counterclockwise in a substantially diagonally upward direction.

In this case, the cam operating portion 64*b* contacts the contact portion 61*a* and further pivots upward, thereby turning the stopper cam 61 approximately 15° clockwise. The main throttle valve operating portion 61*b* pivots clockwise toward the stopper portion 56*a*, and the first idling adjusting bolt 61*c* contacts and slightly pivots the stopper portion 56*a* counterclockwise. The main throttle valve 51 is thereby rotated counterclockwise so as to be slightly opened.

By thus fully opening the sub-throttle valve 52 during the engine cold start, the main throttle valve 51 can be opened at the slight angle (for example, approximately 1°) necessary for the first idling.

After the engine is started and idling is performed for a predetermined period, the sub-throttle valve 52 is rotated clockwise and is returned again to the nearly horizontal position. With this, the intermediate cam 64 pivots clockwise, the cam operating portion 64*b* and the contact portion 61*a* are disconnected, and the stopper cam 61 is returned counterclockwise by the urging force of a return spring 67. Then, the first idling adjusting bolt 61*c* is returned, and the stopper portion 56*a* is returned clockwise until it abuts the valve position adjusting bolt 66. In this way, the main throttle valve 51 is put into a normal operation state.

In this embodiment with the above-described configuration, since the main throttle valve 51 is linked with the sub-throttle valve 52 by the link mechanism 65, it can be opened at the angle necessary for the first idling with a simple structure.

Since the stopper cam 61 is provided with the first idling adjusting bolt 61*c*, it is possible to finely adjust the opening degree of the main throttle valve 51 for the first idling.

By adjusting the first idling adjusting bolt 61*c*, it is possible to arbitrarily determine not only the opening degree of the main throttle valve 51, but also the opening start timing.

Furthermore, since the engine state when the engine is started is detected by the coolant temperature sensor, and the first idling is then performed for a predetermined period, it is unnecessary to use a choke lever, and it is possible to improve the startability of the engine.

Since the cam lever 60, the stopper cam 61, and the intermediate cam 64 are arranged adjacent to one another on one side of the throttle body 50, the overall size of the throttle body 50 can be reduced without increasing the sizes of the components, and the operability of the valves can be improved.

Since the motor 54 for driving the sub-throttle valve 52 and the throttle position sensor 57 are arranged on the same side of the throttle body 50, harnesses of the electric devices are collectively arranged, the operability is improved, and the surroundings of the device are simplified.

The amount of forcible pivot of the main throttle valve 51 by the stopper cam 61 can be arbitrarily controlled while the sub-throttle valve 52 is kept fully opened during while controlling the first idling. Since the main throttle valve 51 is closed during idling, even when the sub-throttle valve 52 is fully opened, it does not give any adverse effect. Therefore, it is possible to finely adjust the amount of forcible pivot by the stopper cam 61 in this state.

While the link mechanism 65 is used to link the main throttle valve 51 and the sub-throttle valve 52 in this embodiment, the present invention is not limited thereto. For example, the throttle valves may be linked by a chain used as the link mechanism, or the operations of the throttle valves may be transmitted by means of a gear.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An air intake control device of a fuel injection engine including a fuel pump, an injector for injecting fuel from said fuel pump, and a throttle body in which said injector is mounted, wherein said throttle body comprises:

a main throttle valve to be opened and closed in connection with the operation of a throttle grip by a driver;

a sub-throttle valve to be opened and closed by motor driving according to the running state of said engine;

a driving rotator mounted at one end of a rotation shaft of said sub-throttle valve so as to corotate with said rotation shaft;

a driven rotator for rotating a main throttle pulley for operating said main throttle valve; and a link mechanism for linking said driving rotator and said driven rotator, and wherein, when said sub-throttle valve is fully opened while said main throttle valve is closed, the rotation of said driving rotator is transmitted to said driven rotator by said link mechanism so as to rotate said driven rotator, and said main throttle valve is opened at a predetermined angle necessary for the first idling by the rotation of said driven rotator.

2. An air intake control device of a fuel injection engine according to claim 1, wherein said link mechanism includes a link member to be linked to said driving rotator, and an intermediate cam connected to said link member at one end and turnably mounted on said throttle body, and a part of said intermediate cam is contacted with said driven rotator so as to rotate said driven rotator.

3. An air intake control device of a fuel injection engine according to claim 1, wherein said driving rotator, said driven rotator, said link mechanism, and said main throttle pulley are placed on one side of the outer periphery of said throttle body, while a sub-throttle pulley for turning said sub-throttle valve, a driving motor for driving said sub-throttle pulley, and a throttle position sensor for detecting a rotation angle of said main throttle valve are placed on the other side.

4. An air intake control device of a fuel injection engine according to claim 1, further comprising:

a coolant temperature sensor for detecting the temperature of a coolant for said engine; and an electronic control device for inputting a detected value from said coolant temperature sensor and controlling the opening and closing of said sub-throttle valve, wherein said electronic control device causes said sub-throttle valve to be fully opened for a predetermined period when said coolant temperature input when said engine is started is lower than a preset value.

5. An air intake control device of a fuel injection engine according claim 1, wherein said engine is mounted in a motorcycle having a pair of main frames disposed on the right and left sides in the frame widthwise direction so as to extend rearward and diagonally downward from a head pipe of a frame, a cylinder head is placed between said main frames with an intake passage opened backward, and said driving motor for said sub-throttle valve is placed on the inner sides of said main frames behind said intake passage.

6. An air intake control device of a fuel injection engine according to claim 1, wherein said sub-throttle valve is placed on the upstream side from said main throttle valve in an air flow direction inside said throttle body.

* * * * *